Aug. 7, 1928.

F. BOWERS 1,680,125

AUTOMATICALLY OPERATED SOOT BLOWER

Original Filed June 10, 1918    10 Sheets-Sheet 2

Inventor
Frank Bowers

By Whitten and Albert S. Whittemore
Attorneys

Aug. 7, 1928.

F. BOWERS 1,680,125

AUTOMATICALLY OPERATED SOOT BLOWER

Original Filed June 10, 1918    10 Sheets-Sheet 3

Inventor
Frank Bowers

By Whittemore Hulbert & Whittemore
Attorneys

Aug. 7, 1928.

F. BOWERS 1,680,125

AUTOMATICALLY OPERATED SOOT BLOWER

Original Filed June 10, 1918    10 Sheets-Sheet 4

Inventor
Frank Bowers

By Whittemore Hulbert Whittemore
Attorneys

Aug. 7, 1928.

F. BOWERS 1,680,125

AUTOMATICALLY OPERATED SOOT BLOWER

Original Filed June 10, 1918    10 Sheets-Sheet 10

Inventor
Frank Bowers
By Whittemore, Hulbert & Whittemore
Attorneys

Patented Aug. 7, 1928.

1,680,125

UNITED STATES PATENT OFFICE.

FRANK BOWERS, OF DETROIT, MICHIGAN, ASSIGNOR, BY MESNE ASSIGNMENTS, TO DIAMOND POWER SPECIALTY CORPORATION, OF DETROIT, MICHIGAN, A CORPORATION OF MICHIGAN.

AUTOMATICALLY-OPERATED SOOT BLOWER.

Application filed June 10, 1918, Serial No. 239,140. Renewed August 23, 1924.

This invention relates to soot blowers and refers more particularly to a new and improved automatic control and operation of electrically or mechanically operated soot blowers.

In general the system consists of the usual number of rotary soot blower units and it is among the objects of the present invention to provide a control which will automatically govern the operation of the various units either electrically or mechanically; to provide an improved clock control which will automatically bring the system into operation at a predetermined time; to so construct and arrange the clock control that after the units have been operated for a predetermined time they will be automatically shut off; to provide means so that the blower system cannot be put into operation by the automatic equipment until the main supply line has been thoroughly drained; to provide an arrangement of parts whereby should any of the units fail to operate the steam supply will be automatically shut off in a short time so as to prevent injury to the baffles or tubes; to provide an automatic shut-off control which will allow the unit to operate during only a portion of its rotation so as to prevent blowing the steam against the baffles or other portions of the boiler which might be injured by the steam jets; to so construct and arrange the control and operating mechanism that the operation of each unit is dependent upon the preceding complete operation of another unit; to provide an improved steam turbine construction for operating the units; to provide an improved drainage system in connection with the automatically operated units; and in general to provide a new and improved operating and controlling mechanism for soot blowers or the like.

The invention also resides in such further details of construction, arrangements and combinations of parts and method of operation as will more fully hereinafter appear.

Describing in detail first the general construction shown in Figure 1, 1, 2, 3, 4 and 5 designate blower units which are preferably of the type comprising rotary steam pipes having suitable discharge nozzles 7. Each of these units is provided with a steam or other cleaning fluid supply pipe 8 leading to a main steam line 9 which may be manually controlled by a valve 10. An automatically controlled valve 17 is employed for successively connecting each of the branch pipes 8 to the main steam line. In the construction shown in Figure 1 each of the units 1, 2, etc. is provided with a driving mechanism which is shown only in association with the unit 1, being merely indicated diagrammatically in connection with the other units. This mechanism comprises a steam turbine 12 which, through gears 14, a worm 73, and worm wheel 74 (see Figure 3) is connected to drive the corresponding unit. The turbine 12 is preferably housed in a casing 15 which is attached to the head of the blower unit and also serves to carry the gearing. Steam to each of the turbines is admitted through an inlet pipe 16 which at one end opens into the corresponding branch supply pipe 8. By this arrangement the supply of steam to all of the turbines is governed by the automatically controlled valve 17 the latter being controlled by the clock mechanism 18 in the manner hereinafter described in detail.

Figures 4, 5, 9, 10:
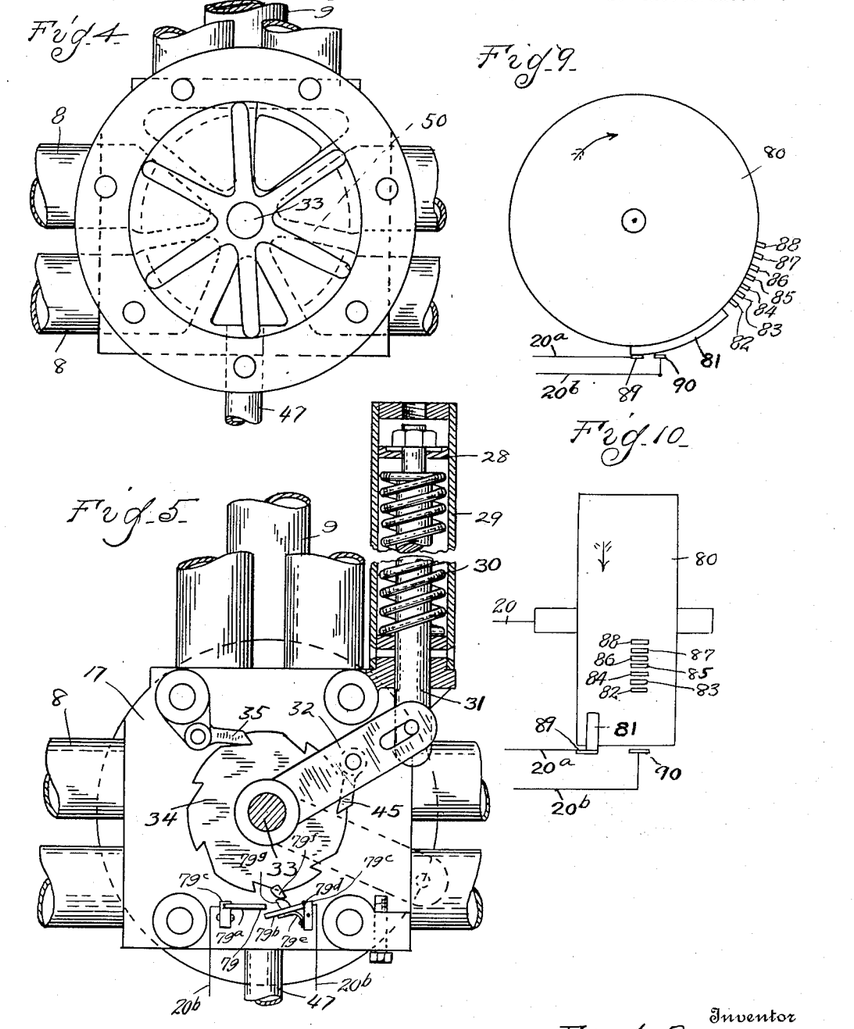
Figure 4 is an enlarged elevational view of a valve whereby steam may be successively admitted to blower units located in various parts of a boiler.
Figure 5 is an enlarged detail view of a ratchet mechanism for actuating said valve showing in section a steam plunger for actuating said mechanism.
Figures 9 and 10 are detail views of the clock operated switch.
Figure 6:
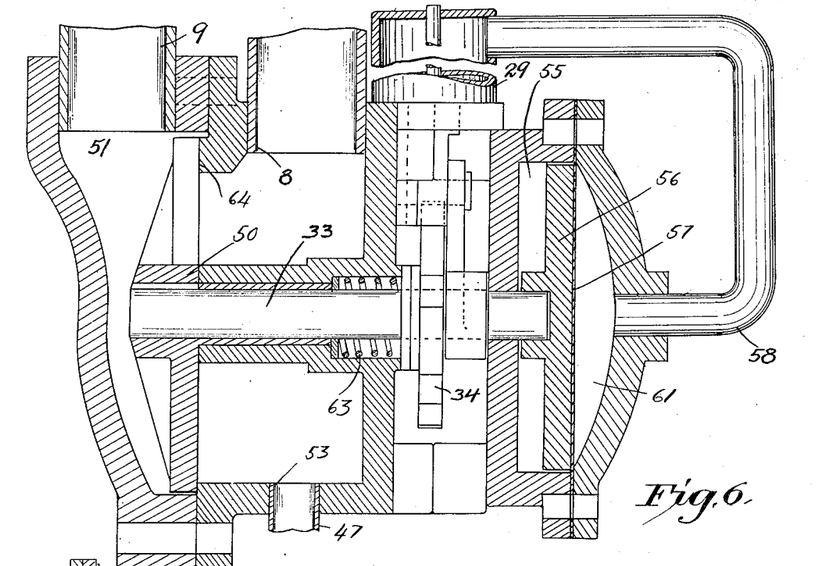
Figure 6 is an enlarged vertical section showing the attachment for reducing the friction on the valve.

This clock controls an electric circuit, there being a main lead wire 19 and an interrupted lead wire 20, the latter of which is governed by a switch controlled by the clock mechanism 18. A plurality of normally closed switches 21, 22, 23, 24 and 25 in the main circuit wire 19 cooperate with the clock controlled mechanism for governing the supply of steam to the respective units and the turbines for operating the same. Thus when the clock mechanism 18 closes said circuit there is an impulse given to the solenoid member 26 causing it to open the valve 27 and admit steam (as hereinafter described) above the piston 28 which operates in the cylinder 29, preferably against the resistance of the spring 30. The plunger 31 of the piston 28 is connected at its lower end to an arm 32 which is pivoted at 33 and arranged to operate a seven-way valve 17. A suitable ratchet 34 and locking dog 35 serve to make the valve operate in one direction only. The detailed construction and operation of the valve and ratchet mechanism is shown in Figures 4, 5 and 6.

The initial downward movement of the plunger will rotate the valve, opening the main steam line through the valve 17 to the branch pipe 8 leading to the unit 1. Steam will then flow through the branch pipe 8 and the inlet pipe 16 to the turbine, rotating the shaft 36 of the latter. Rotation of shaft 36 acts through reduction gear train 14, shaft 71, worm 73 and worm wheel 74 to rotate the blower unit 1.

Secured to rotate with the unit is a cam 37 which extends around only a portion of the periphery and located in the path of this cam 37 is a roller 38 carried by one end of a rock-arm 39 which is pivoted at 40. The other end of the rock arm 39 is connected by a rod 41 to a lever 42 which is pivoted to the casing of the valve 11, the valve being normally spring closed. When, however, the cam 37 strikes against the roller 38 it will rock the arm 39 raising the rod 41 and forcing the projection 43 of the lever 42 against the end of the valve stem 44. This will open the valve 11 and hold it in its open position so that steam passes to the unit 1 as long as the cam 37 is in engagement with the roller 38. As soon, however, as the unit has rotated to the position shown in Figure 1 the roller will be released by the cam and return to its normal position, permitting the valve 11 to be closed by its spring and thus automatically shutting off the supply of steam to the unit.

Figure 19:
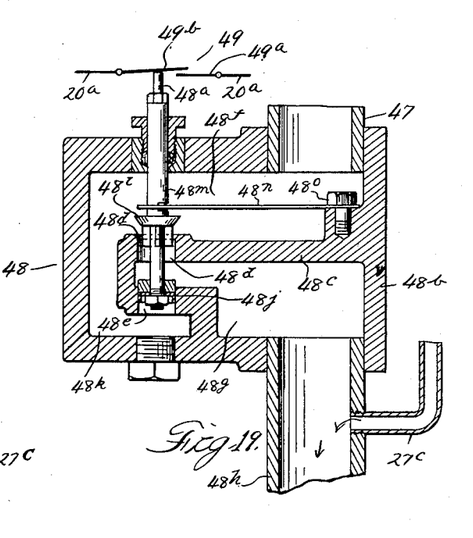
Figure 19 is a detail sectional view of the drain valve.

When the solenoid 26 was first operated it actuated the valve 27 to a position where the steam supply line 9 was connected through pipe 27ᵃ to admit steam through port 27ᵈ of valve 27 and pipe 27ᵇ to the top of the piston 28; but the rocking movement of the lever 39 in the operation of the unit 1 opened the switch 21, thus breaking the circuit to the solenoid 26 in the manner hereinafter described. This interruption of the main circuit caused the solenoid to return to its initial position adjusting valve 27 so as to shut off the steam from the supply line 9 to pipe 27ᵇ and to establish communication between pipe 27ᵇ and exhaust pipe 27ᶜ by reason of port 27ᵉ in the valve 27. The exhaust pipe 27ᶜ may conveniently lead to a waste pipe 48ʰ as shown in Figure 19. This releases the pressure on the top of the piston 28 and permits the spring 30 to return the plunger 31 and piston 28 to their upper or initial positions, ready to receive the next impulse. When, however, the lever 39 returns to its normal lowered position it closes the switch 21 and again completes the circuit to the solenoid 26. This automatically adjusts the valve 27 to admit steam above the piston 28 and forces the piston and plunger 31 downward.

Since the dog 45 on the lever 32 has been brought back to engage another notch in the ratchet wheel 34, the downward movement of the plunger 31 and its arm 32 will rotate the valve 17 one step further, so as to open the steam supply to the header 8 of the unit 2. As these units and their control mechanisms are similarly constituted, it is obvious that the operation described in connection with unit 1 will be repeated through units 2, 3, 4 and 5, or as many more units as there are in the system. The valve 17 is so constructed that after having made the connection to all of the units of the series it will connect to the drain 47 in its neutral position. Thus any condensate formed in the main supply line 9 between blowing periods passes out through pipe 47 and is disposed of by the thermostatic valve 48. After the condensate has passed through valve 48 this valve will cut off communication between the main supply line 9 and waste pipe 48ʰ and will, under the influence of the live steam, close the switch 49 so as to place the system ready for the next blowing cycle. Since the branch pipes 8 are supplied with steam for only a relatively short period for each blowing cycle, it is not important that these pipes be drained. The main supply line 9 however, contains steam at all times and it is desirable to rid this line of the condensate.

There is connected into the clock controlled main circuit a switch 49 which is held open by means of the thermostatic drain valve 48 as long as there is any condensate from the system passing through the valve. With reference to Fig. 19, this valve comprises a casing 48ᵇ divided by a wall 48ᶜ having ports 48ᵈ and 48ᵉ. The port 48ᵈ establishes communication between inlet chamber 48ᶠ and outlet chamber 48ᵍ. The chamber 48ᶠ communicates with the drain pipe 47 and the chamber 48ᵍ communicates with a waste pipe 48ʰ. This waste pipe also affords an outlet for the exhaust steam from pipe 27ᶜ. The port 48ᵉ serves to house the balancing piston 48ʲ. The port 48ᵈ is controlled by valve 48ⁱ mounted on a valve stem 48ᵐ, the upper end of which carries the plunger 48ᵃ. This plunger 48ᵃ serves to engage contact element 49ᵇ of switch 49 and to move the same out of contact with the fixed contact member 49ᵃ whenever the drain valve is filled with condensate. The piston 48ʲ is also mounted on the valve stem 48ᵐ. For controlling the movement of valve 48ⁱ, a thermostatic element 48ⁿ is provided, one end of this element being fixed at 48ᵒ to the casing 48ᵇ and the other end being fixed to the valve stem 48ᵐ. This thermostatic element 48ⁿ is a differential expansion element adapted to move the valve stem upwardly to open switch 49 and unseat valve 48ⁱ when the thermostatic element is subjected to the condensate and to move the valve stem downwardly closing switch 49 and seating valve 48ⁱ when the element is subjected to the steam. The chamber 48ᵏ permits fluid to act on the underside of piston 48ʲ so as to substantially balance the effect of the fluid pressure acting on the upper side of the valve 48ⁱ, thus permitting the thermostatic element 48ⁿ to act substantially free from pressures on the valve.

In Figures 4, 5 and 6 the detailed construction of the valve 17 is shown. This valve comprises a plate member 50 which controls the communication between the inlet 51 from the main header 9 and the various branch supply pipes 8 leading to the units 1, 2, 3, 4 and 5 respectively. In addition to the main supply pipe connection and the five branch supply pipe connections there is a port 53 leading to the drain pipe 47. This cover plate or rotary valve 50 is connected to turn with the ratchet wheel 34 and is thus operated through the arm 32 and piston 28 in the manner previously described.

When the steam pressure is high there is danger of the plate or valve member 50 being placed under such friction as to make its operation by the steam plunger difficult. To overcome this objection I have provided a novel arrangement whereby the stem 33 of the plate or valve member 50 is projected through into a chamber 55. The end of this valve stem abuts against a plate 56 which is connected to a suitable diaphragm 57. This diaphragm extends across the chamber 55 dividing it into two parts. The part opposite the stem 33 is provided with a steam connection 58 which leads to the upper end of the chamber 29. By this arrangement whenever steam is admitted above the piston 28 it will simultaneously be admitted through the pipe 58 to the space 61 on the right hand side of the diaphragm, as shown in Figure 6. This will tend to force the diaphragm 57 and the plate 56 toward the left and exert a sufficient pressure on the end of the stem 33 to counterbalance the pressure on the opposite side of the plate or valve member 50, thus preventing the binding of the valve irrespective of the amount of steam pressure employed in the system. Whenever the valve 27 is adjusted to release the pressure on the top side of the piston 28, it will by thus releasing the pressure in the chamber 29 also release the pressure on the right hand side of the diaphragm 57, allowing the spring 63 to return the stem 33 toward the right and thus hold the plate or valve member 50 in sufficiently tight contact with the wall 64 to avoid any danger of leakage.

Figure 7:
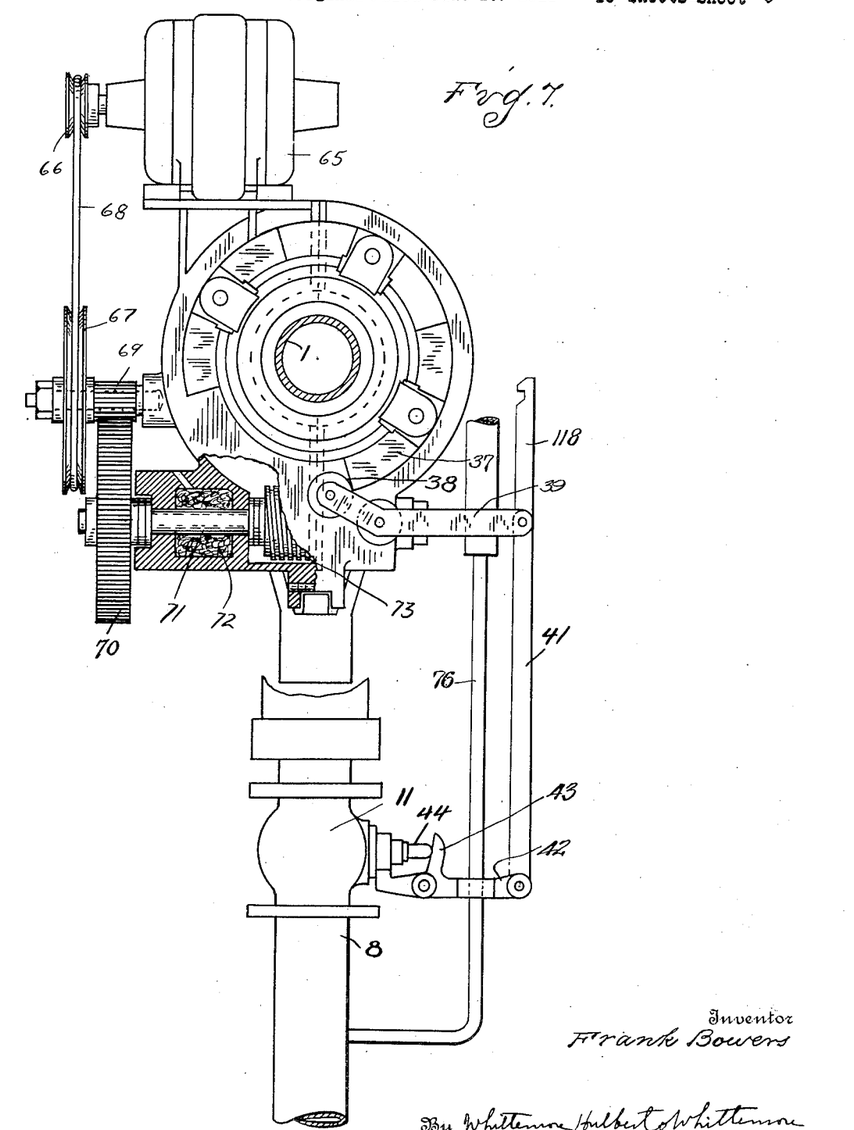
Figure 7 is an enlarged elevational view of the electrically operated unit, certain parts being broken away for the sake of clearness.
Figure 8:
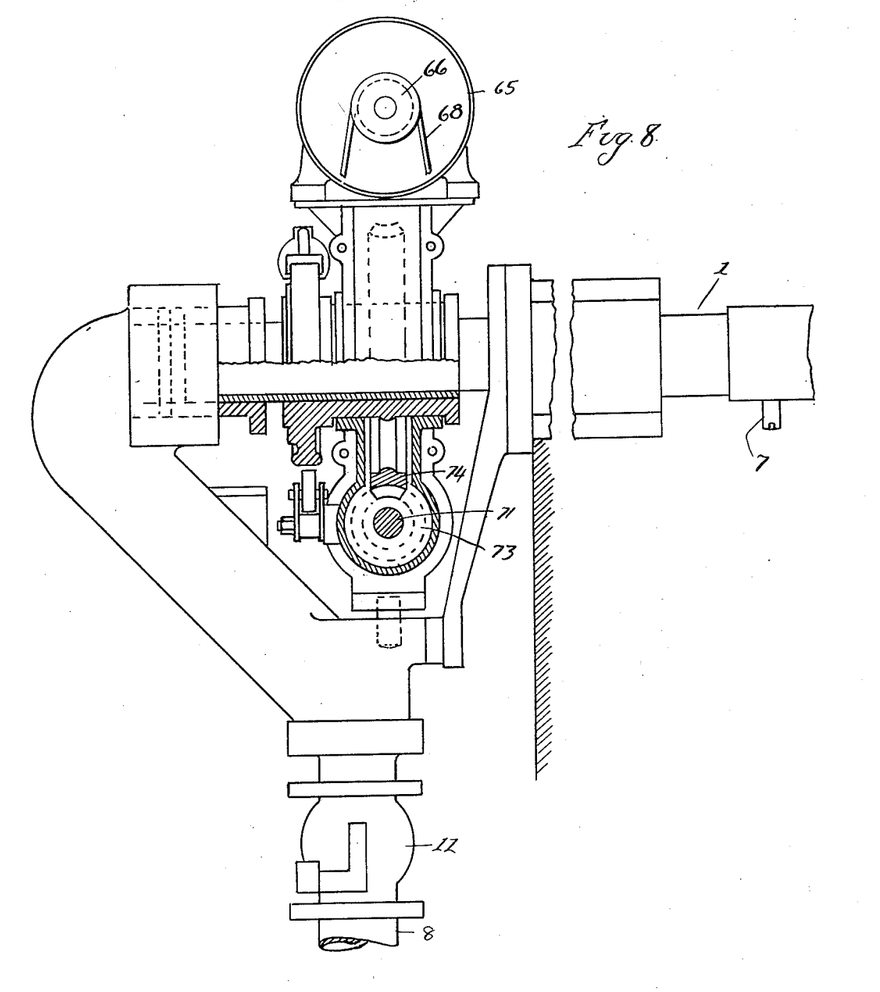
Figure 8 is a view taken at right angles to Figure 7, the upper portion in elevation and the lower in section.

Taking up next in detail the electrically operated and electrically controlled system shown in Figures 2, 7 and 8, the general arrangement of parts is similar to that described in connection with the steam operated and controlled mechanism, except that a motor 65 is substituted for the steam turbine, this motor being connected by pulley wheels 66 and 67 and belt 68 to a small pinion 69 meshing with a large gear 70 on the shaft 71. This shaft extends through a suitable packed bearing 72 preferably formed integral with the casing for the blower head and best shown in Fig. 7. At its inner end the shaft 71 is provided with a worm 73 meshing with a worm wheel 74 which is keyed to the respective units 1, 2, 3, 4 and 5 in the same manner as in the steam turbine device. The same cam 37, roller 38 and lever 39 are employed, the free end of the lever being connected by a rod 41 to the lever 42 which controls the inlet valve 11 in the same manner as the steam turbine control. In using this electrically operated and electrically controlled system the same clock mechanism 18 is employed. When this clock mechanism closes the main circuit an impulse is given to the solenoid 26 operating the valve 27 to admit steam above the piston 28 in the cylinder 29, thus rotating the valve 17 in the manner previously described and turning the same from the neutral position to the port connected with the pipe 8 leading to the unit 1. Steam then flows into the supply pipe 8 of this unit and through a branch pipe 76 to an electric cut-out 77 (see Figure 11) which is operated by a plunger 78 forced up by the steam pressure. As this plunger moves upward the cut-out 77, in the manner hereinafter described, breaks the circuit to the solenoid 26 and closes the circuit to the motor 65 for driving the head 1. The operation of this motor through the pulleys 66 and 67, belt 68, pinion 69, gear 70, shaft 71, worm 73 and worm wheel 74 rotates the unit, carrying with it the cam 37. As the cam strikes against the roller 38 the arm 39 is rocked which, through the rod 41, draws the lever 42 upward and opens the valve 11. The steam then flows through the unit 1 and discharges through the nozzles 7 to the boiler tubes or other surfaces to be cleaned for that portion of the rotation of the unit where the valve 11 is held open by the action of the cam 37 on roller 38 and its associated parts so that the jets of steam do not impinge on the baffles or other surfaces which it is not desired to blow.

By proportioning the number or circumferential length of the cams 37 the period through which each unit blows can be proportioned to take care of the particular location and mounting of the unit with reference to the baffles, walls and other parts of the boiler. When the cam passes out of engagement with the roller the lever 42 returns to its normal position, permitting the valve 11 controlling the unit 1 to close and at the same time breaks the connection to the motor for said unit. It also simultaneously closes the circuit to the solenoid 26, causing the solenoid operated valve 27 to again admit steam above the piston 28. This causes the valve 17 to be given a further step in the rotation so as to bring its port into registration with the branch supply pipe 8 leading to the unit 2.

The system will then automatically operate units 2, 3, 4 and 5, or whatever number there are in the system, in the same manner as described in connection with unit 1. There will now be described a provision, whereby in all cases after the connection is made to start unit 1 in operation, the operation of the succeeding units is made dependent upon the successful preceding operation of one or more of the other units in their proper order. By this arrangement it will be impossible for the system to continue operating automatically unless all of the units are in proper working order. The clock mechanism 18, hereinafter described, is such as to break the circuit of the solenoid 26 upon completion of a blowing cycle and said circuit remains broken until the proper time interval between the blowing cycles has elapsed, provided that the valve 17 has been returned to its normal neutral position.

Figure 17:
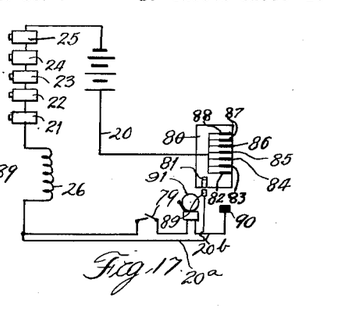
Figure 17 is a diagrammatic wiring diagram of the auxiliary circuit.
Figure 18:
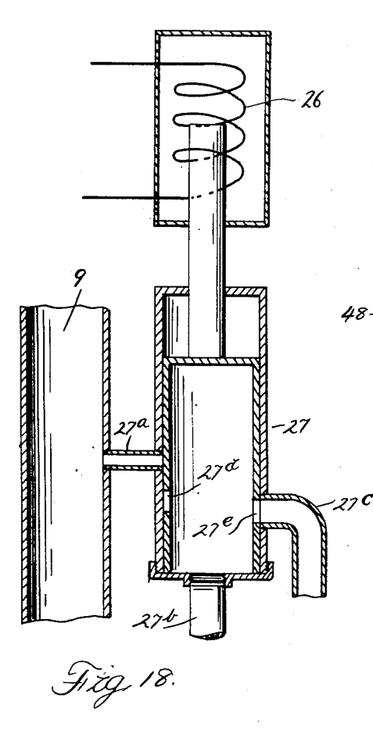
Figure 18 is a detail sectional view of the solenoid valve.

After the clock mechanism 18 has brought the system into operation by initially closing the circuit, it will continue to operate automatically until each of the units has been operated for cleaning purposes and the valve 17 returned to its neutral position. However, to guard against the valve standing in a position wherein the steam supply is connected to any unit for more than a few minutes at a time, provision is made whereby the clock mechanism will, at the close of the normal blowing cycle close an auxiliary circuit shown in Fig. 17 giving a plurality of impulses to the solenoid 26 tending to operate the solenoid valve 27 a number of times in rapid succession. This is accomplished by means of an auxiliary circuit arranged independently of the main operating circuit 19, 20 and 20ª. This auxiliary circuit is so arranged that it is also broken when the valve 17 is in its neutral position. This auxiliary circuit is hereinafter described in further detail. This auxiliary circuit is so arranged that it is automatically broken at a switch 79 when the rotary valve 17 is in neutral position. This switch 79 is best shown in Fig. 5 which shows this switch open corresponding to the neutral position of the valve 17. In detail this switch 79 comprises complementary contact members 79ª and 79ᵇ, the member 79ª being rigidly carried by a bracket 79ᶜ insulated from and mounted to the face of the casing for valve 17. The other member 79ᵇ is swingingly carried at 79ᵈ by a similar bracket 79ᵉ and is kept in contact with contact member 79ª, in other positions than the neutral position of valve 17 by reason of a leaf spring 79ᵉ. In the neutral position of valve 17, the circuit 20ᵇ is broken by reason of separation of the contact members 79ª and 79ᵇ produced by a lug 79ᶠ carried on the face of ratchet wheel 34 engaging a lug 79ᵍ carried on the contact member 79ᵇ, causing the latter member to swing on its hinge 79ᵈ into the position shown in Fig. 5. Therefore these impulses have no effect if the valve 17 has been properly turned to its closed or neutral position. If, however, the operation has been interrupted by the binding of any unit or for any other reason, the rapid succession of impulses applied to solenoid 26 through the auxiliary circuit will insure the valve being returned to its neutral position. This prevents steam from being blown through the valve on any one unit for more than a few minutes at a time.

Figure 1:
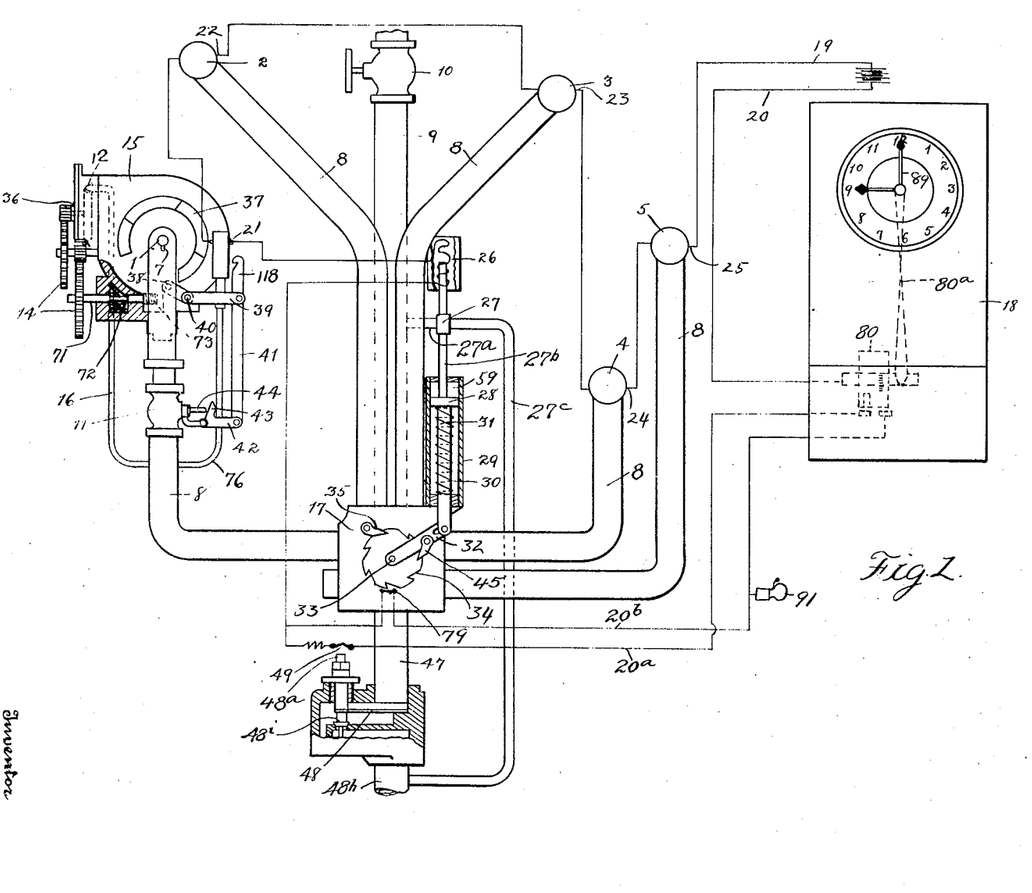
Figure 1 is a diagrammatic view showing one embodiment of my invention.
Figure 2:
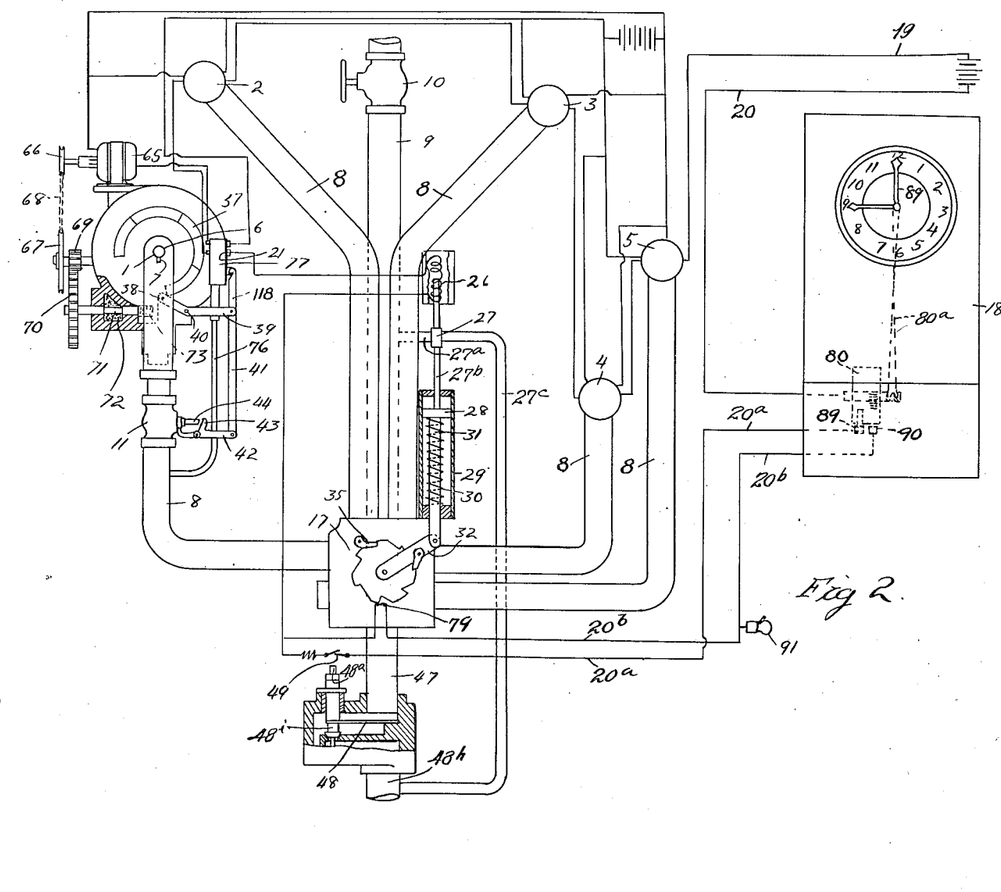
Figure 2 is a similar view showing electric motor operating devices substituted for the steam turbines of Figure 1.
Figure 3:
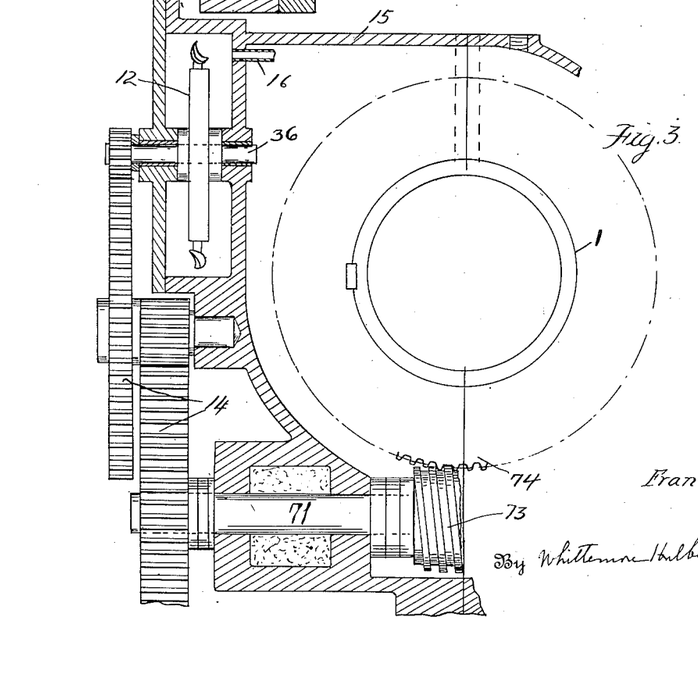
Figure 3 is an enlarged fragmentary sectional view through the steam turbine head.
Figure 16:
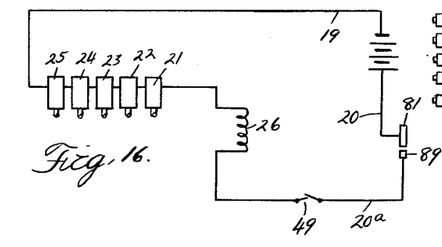
Figure 16 is a diagrammatic wiring diagram of the main circuit.

Taking up in detail the electric control by the clock mechanism 18, it will be noticed in Figures 1 and 2 that the clock 18 is provided with a drum 80 rotatably driven through a chain 80ª from the clock mechanism. As best shown in Figures 9 and 10, drum 80 is provided with a main contact 81 and a plurality of short separated contacts 82, 83, 84, 85, 86, 87 and 88, the main contact 81 and the separated contacts being in electrical contact with the drum 80. The main contact 81 is located in advance of the separated contacts. Assuming now that it is desired to operate each of the units for a period of one minute each, the entire system being operated once every hour; whenever the cylinder 80 makes one revolution it will bring its main contact 81 into engagement with the brush 89. It will continue in this position for a period of six minutes, or whatever period of operation is desired. All the time that the brush 89 is in engagement with the contact 81 the main circuit will be closed and the solenoid 26 operated in the manner previously described. This main circuit is diagrammatically illustrated in Fig. 16. Just subsequent to the contact 81 passing out of engagement with the brush 89, the brush 90 will come into operation and will then successively register with the contacts 82, 83, 84, 85, 86, 87 and 88. These contacts are preferably arranged sufficiently close together so as to just allow a time interval sufficient for the operation of the piston 28 and its return to its upper or normal position. In this manner the necessary seven impulses are given to the ratchet wheel so as to return the valve to its neutral position even though the first unit is the one which is out of order. It will be noted that this auxiliary circuit is entirely independent of a proper functioning of the main circuit. If the second or any subsequent unit of the series is the one which is not operating properly the six impulses given through the closing of the circuit by the contacts 82, 83, etc. can only return the valve to its neutral position; since when it reaches the position of rotation where the valve is in neutral position the circuit through branch 20ᵇ will be broken at the switch 79.

There is also preferably included in the branch 20ᵇ a bell or other suitable alarm 91 which whenever the circuit is closed through said branch will sound an alarm which will call the attention of the operator to the fact that the system is not operating.

Figures 11, 12, 13:
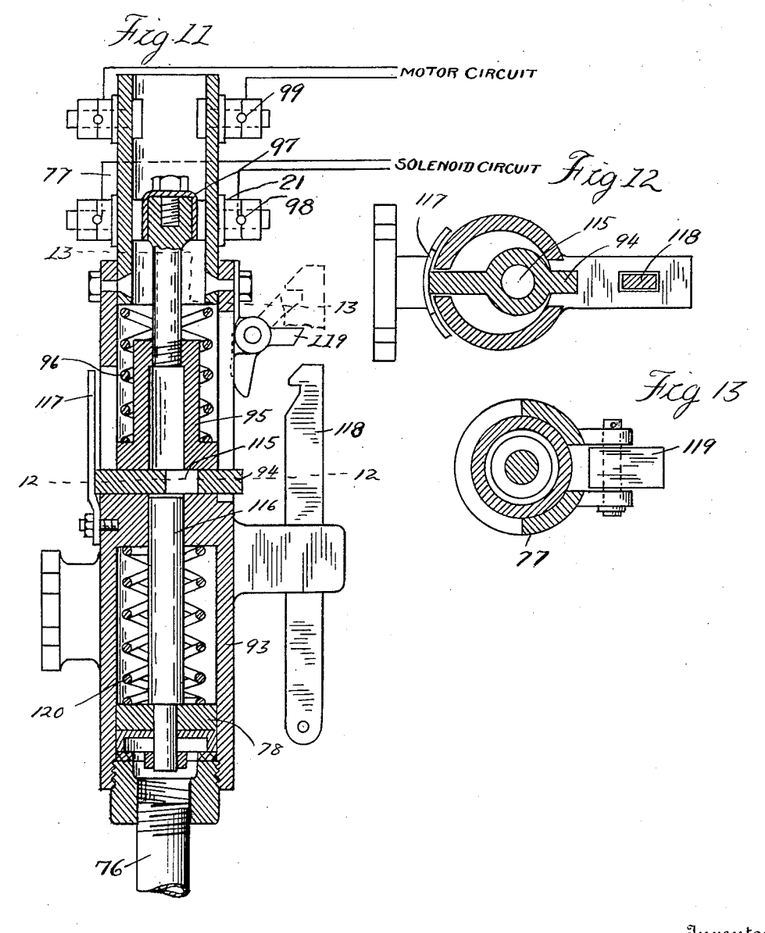
Figures 11, 12 and 13 are detail sectional views of the electric cut-out mechanism, the lines 12—12 and 13—13 on Figure 11 indicating where the sections for Figures 12 and 13 are taken.

In both the construction shown in Figure 1 and that shown in Figure 2 the electric cut-out 77 is employed to operate the switches 21, 22, etc., which are respectively associated with the blower units 1, 2, etc. These switches are in series in the wire 19 for breaking the circuit to the solenoid as soon as steam has been admitted to the header 8 for any of the units and from there through the pipe 76 beneath the plunger 78 which actuates the electric cut-out 77. The detailed construction of this electric cut-out mechanism is shown in Figures 11, 12 and 13 and comprises in addition to the plunger 78 a cylinder 93 in which the plunger 78 operates. The stem of this plunger strikes against a member 94 slidable both vertically and horizontally above which is positioned a vertically sliding member 95 normally pressed downward by the spring 96. Secured to the member 95 so as to reciprocate therewith is a movable contact member 97 which in the lower position of the parts engages with the solenoid contacts 98 and thus closes the circuit to the solenoid 26. As soon, however, as steam is admitted to the underside of the plunger 78 for any of the units it will raise the members 94 and 95 and shift the movable contact 97 of that particular unit out of engagement with the solenoid contacts and thus break the circuit to the solenoid 26 as previously mentioned. In the electrically driven units described in connection with Figure 2 this movable contact performs a further function of closing the circuit to the motor by engaging with the motor contacts 99 of the cut-out mechanism.

In order to permit of the circuit to the motor being broken and the circuit to the solenoid 26 being closed before the plunger 78 returns to its lower position, a lost motion arrangement is provided for the cut-out mechanism 77.

As shown in Figure 11 the member 94 is provided with an aperture 115 which is normally out of registration with the end of the rod 116 carried by the plunger 78. The member 94 is held in this position by a spring 117 so that the upward movement of the plunger lifts the member 94 together with the contact 97 upward and compresses the spring 96. When the rod 41 is lifted by the cam 37, rocking the lever 39, it carries the trip member 118 upward, forcing the locking dog 119 to the position shown in dotted lines, where it will not act upon the slidable member 94. When, however, the cam 37 is rotated to a point where it passes out of engagement with the roller 38 and the lever 39 returns to its normal position, it will, by bringing the trip member 118 downward, act upon the dog 119 and force the slidable member 94 inward against the tension of the spring 117. As soon as this member 94 is moved inward a sufficient distance to bring its port or aperture 115 into registration with the end of the rod 116 the spring 96 will force the member 95 together with the contact member 97 downward, sliding the members 94 and 95 over the rod 116 which is still in its upper position. Thus the contact 97 is brought out of engagement with the motor circuit contacts 99 and into engagement with the solenoid contacts 98 so as to break the motor circuit and close the circuit to the solenoid 26, while the plunger 78 is still held in its upper position. Upon release of the pressure beneath the plunger 78 by adjustment of the valve 17 as previously described, the spring 120 will force the plunger 78 downward to the position shown in Figure 11 where the cut-out mechanism is ready for another cycle of operation.

By this novel arrangement of parts both the solenoid and motor circuits are automatically controlled and it will, of course, be understood that in the construction shown in Figure 1 the motor contacts 99 will be omitted.

In the construction shown in Figure 14 I have disclosed a system in which the units 1, 2, 3, 4 and 5 are not only operated by steam turbines 12 in the same manner as described in connection with the arrangement shown in Figure 1, but are also controlled by a steam and clock control. The same type of control valve 17 is employed but in place of a solenoid for operating the plunger 31 there is employed a direct steam control as follows: Leading from the main steam line 9 is a branch 101 which is connected to the lateral header 102 through a pipe 103 controlled by a valve 104. The latter is normally positioned so as to close communication between the branch pipe 101 and the header 102 and is actuated into open position through a plunger 105. The latter has an end 106 extending in the path of one or more cams 107 mounted on a member 108 which is rotated by the clock mechanism (not shown).

Figure 14:
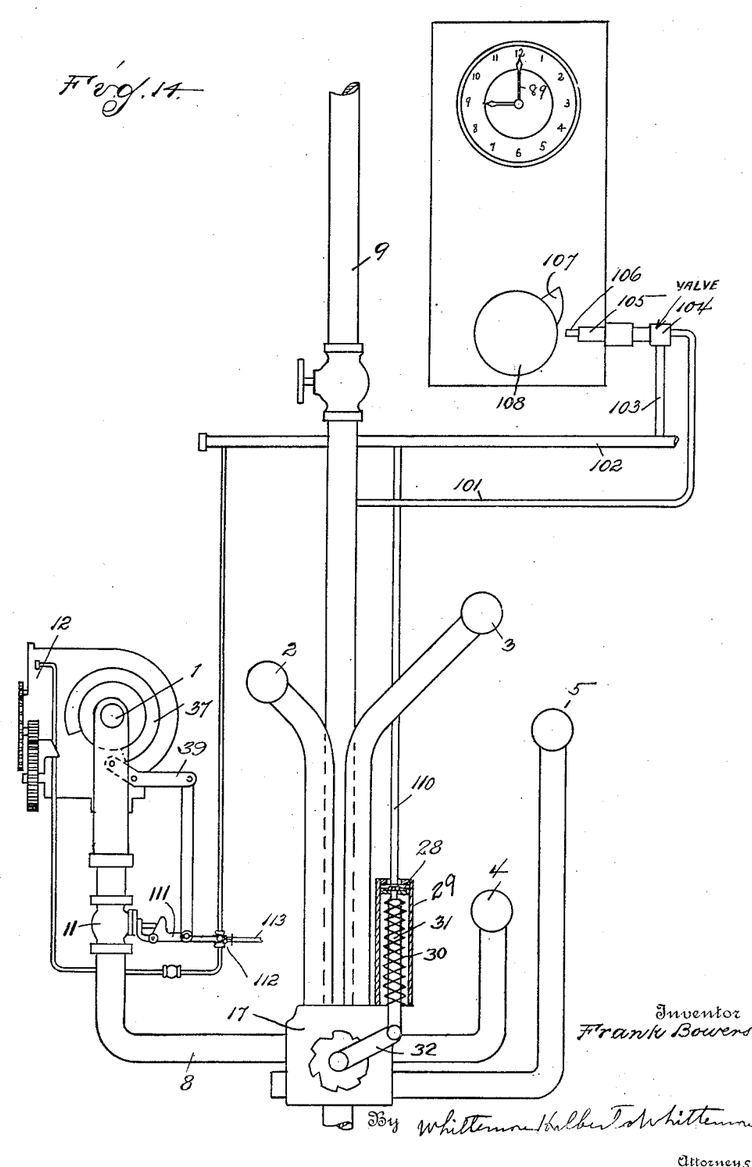
Figure 14 is a view similar to Figure 1 showing a still further modification.

The arrangement as so far described is such that whenever the clock rotates the member 108 to bring a cam 107 into registration with the end 106 of the plunger, it will move the latter to the right of the position shown in Figure 14 and permit steam to flow through the branch pipes 101 and 103 to the header 102. As the latter is in open communication with the top of the cylinder 29 above the plunger 31 by means of a branch pipe 110, this will place pressure on the top of the plunger and move the latter down in the cylinder so as to actuate the valve 17 an amount sufficient to open a new steam supply to the pipe 8 for the unit 1, in the same manner as described in connection with the electrically controlled device. Steam will then flow to the turbine 12 of the unit 1, causing the blower pipe to rotate and through the action of the cam 37 on the lever 39 will lift the valve operating member 111 and open the valve 11. The upward movement of the valve operating member 111 is also utilized for opening the three-way valve 112 so as to connect the header 102 with the exhaust 113 and close communication between the header 102 and the pipe 8. This will release the pressure on the top of the plunger 31 and allow the latter to be returned by the spring 30 to its normal raised position ready to receive the next impulse. As soon as the unit has been rotated to bring the low point of the cam 37 into registration with the roller 38 on the lever 39, the valve operating member 111 will move back to its initial position, thus allowing the valve 11 to close and shut off the supply of steam to the unit 1. At the same time the three-way valve 112 shuts off communication between the header 102 and the exhaust 113 and re-opens communication between the pipe 8 and the header 102. This restores pressure to the top of the plunger 31 and actuates the valve 17 so as to open communication between the main supply pipe 9 and the unit 2. This cycle of operation will then be carried out for each of the units 2, 3, 4, and 5 or whatever number there may be in the installation.

Figure 15:
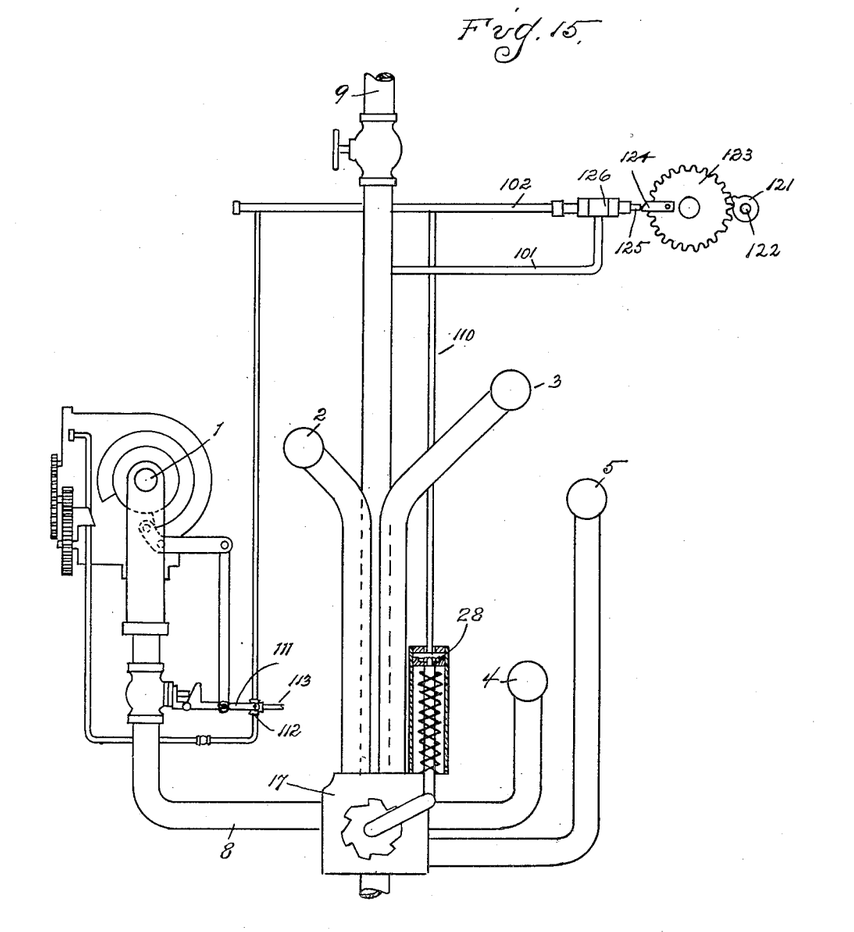
Figure 15 is a view similar to Figure 14 but showing a different control.

In place of using a clock for starting the system in operation, the blower system can be automatically put into operation by a connection to some suitable member which is movable in the normal operation of the boiler. Preferably it is operated as shown in Figure 15 by a connection to the shaft of the stoker. In detail the construction comprises a one tooth gear 121 mounted on the stoker shaft 122, this gear meshing once each revolution with a large gear 123 carrying the cam 124 which once each revolution acts on the stem 125 of the control valve 126 in the same manner that the cam 107 acts on the stem 106 in the construction shown in Figure 14. By connecting this control mechanism to the stoker shaft, the blowers are automatically operated in direct proportion to the number of operations of the stoker, the cleaning operations thus corresponding to some extent to the rate of combustion in the boiler. In place of the cam 124 acting on the stem 125, the gear 123 could carry contacts and thus exercise an electrical control similar to that of the clock controls shown in Figures 1 and 2.

From the description of the construction shown in Figure 15 it will be apparent that the units are automatically operated and controlled, this particular system being specially adapted for plants which are not electrically equipped. It has the further advantage that none of the control is dependent upon electricity but is so co-related to the steam supply that whenever the latter is available for soot blowing purposes it is also available to operate the automatic blowers and control therefor.

While I have shown and described certain constructions of operating and controlling mechanism, the invention is not limited to the particular embodiments of my invention shown and described, except as ultimately set forth in the claims.

What I claim as my invention is:—

1. In a boiler cleaner system, the combination with a plurality of soot blower units connected with a main supply line, of electrically governed control means for automatically bringing into operation successively the various units of the system, and means for draining the boiler cleaner system, said control means being arranged to prevent the automatic operation of the system until the said supply line has been thoroughly drained.

2. In a boiler cleaner system, the combination with a plurality of rotatable soot blower units, and a main steam supply line for the units, of means for draining the supply line, and electrically governed means for automatically rotating said units and controlling the supply of steam thereto, said control means being provided with an electric cut-out which will prevent the automatic operation of the blower units until the supply line has been thoroughly drained.

3. In a boiler cleaner system, the combination with a plurality of rotatable soot blower units, of electrically governed means for automatically rotating said units and controlling the supply of steam thereto, said control having means for automatically shutting off the supply of steam after the system has been in operation a predetermined time irrespective of the operation of the various units.

4. In a boiler system, the combination with a plurality of rotatable blower units, of means for successively rotating the units of the system, an electric circuit for governing the rotation of the units, a clock mechanism for closing the circuit at predetermined intervals, said means having a valve controlling the passage of steam to said units, and said clock mechanism being arranged to automatically return said valve to its neutral position after the system has been in operation for a predetermined period of time.

5. In a boiler cleaner system, the combination with a plurality of rotatable soot blower units, of a steam supply, branch pipes leading from the steam supply to said units, a rotatable valve controlling communication between said steam supply and said branch pipes, a steam operated plunger for actuating said valve, and means for automatically operating said plunger to adjust said valve at predetermined intervals so as to successively connect each of the units to said steam supply.

6. In a boiler cleaner system, a soot blower, a steam supply line therefor, control means for bringing said blower into operation, and means for draining the supply line, said control means being arranged to prevent operation of the boiler cleaner until the supply line has been drained.

7. In a boiler cleaner system, the combination with a plurality of soot blower units and a steam supply line for the units, of control means for bringing into operation the various units of the system, means for draining the supply line, and means preventing the operation of the system until the supply line has been drained.

8. In a boiler cleaner system, the combination with a plurality of soot blower units and a steam supply line for the units, of control means for automatically bringing into operation the units of the system, means for draining the supply line, and means for preventing automatic operation of the system until the supply line has been drained.

9. In a boiler cleaner system, the combination with a plurality of rotatable soot blower units, of means for automatically rotating said units and controlling the supply of steam thereto, said control having means for automatically shutting off the supply of steam after the system has been in operation a predetermined time irrespective of the operation of the various units.

10. In a boiler cleaner, a source of cleaning fluid, a rotatable soot blower, cleaning fluid operated means for rotating said blower, means for controlling the passage of cleaning fluid to said rotating means, and a valve automatically operated in timed relation with the rotating means for admitting cleaning fluid to the soot blower.

11. In a boiler cleaner, a source of cleaning fluid, a soot blower, a prime mover for operating said blower, controlling means for periodically admitting cleaning fluid to the prime mover for operating the same, and a valve automatically actuated in timed relation with the operation of the prime mover for admitting cleaning fluid to the soot blower.

12. In a boiler cleaner, a source of cleaning fluid, a plurality of soot blower units, a prime mover for actuating each of said units, a common control for admitting cleaning fluid successively to said units, and a valve for each unit automatically actuated by the corresponding prime mover for admitting cleaning fluid to the blower unit.

13. In a boiler cleaner, a source of cleaning fluid, a plurality of soot blower units, a prime mover for actuating each of said units, a common control valve for admitting cleaning fluid successively to said units from said source, a fluid operated piston for intermittently actuating said valve, means for introducing the fluid to actuate said piston and a valve for each unit automatically actuated by the corresponding prime mover for admitting cleaning fluid to the blower unit.

14. In a boiler cleaner, a plurality of rotatable soot blower units, a source of cleaning fluid, a valve for each unit for admitting cleaning fluid thereto, a prime mover for each unit for simultaneously rotating the unit and actuating the said corresponding valve to admit steam to the unit, and a multiple control valve for successively admitting steam from said source to said prime movers, and means for actuating said multiple control valve.

15. In a boiler cleaner, a plurality of rotatable soot blower units, a source of cleaning fluid, a valve for each unit for admitting cleaning fluid thereto, a prime mover for each unit for simultaneously rotating the unit and actuating the corresponding valve to admit steam to the unit, a multiple control valve for successively admitting steam from said source to said prime movers, a fluid operated plunger and mechanism for periodically advancing the multiple control valve by said plunger.

16. In a boiler cleaner, a plurality of rotatable soot blower units, a source of cleaning fluid, a valve for each unit for admitting cleaning fluid thereto, a prime mover for each unit for simultaneously rotating the unit and actuating the corresponding valve to admit steam to the unit, a multiple control valve for successively admitting steam from said source to said prime movers, a fluid operated plunger and mechanism for periodically advancing the multiple control valve by said plunger, and automatic means for periodically causing cleaning fluid to act upon the plunger to effect the said periodic advancing of the valve.

17. In a boiler cleaner system, the combination with a plurality of soot blower units, of a steam supply, branch pipes leading from the steam supply to said units, a rotatable valve controlling communication between said steam supply and said branch pipes, a steam operated plunger for actuating said valve, and means operated by said plunger to adjust said valve so as to successively connect each of the units to said steam supply.

18. In a boiler cleaner system, the combination with a plurality of soot blower units, of a steam supply, branch pipes leading from the steam supply to said units, a valve controlling communication between said steam supply and said branch pipes, a steam operated plunger for actuating said valve, and means operated by said plunger to adjust said valve so as to successively connect each of the units to said steam supply.

19. In a boiler cleaner, a blower element, a steam supply, means for periodically admitting steam to said blower element said means including a steam operated plunger, and means for controlling the admission of steam from said supply to said plunger.

20. In a boiler cleaner system, a plurality of blower units adapted to function successively, a multiported valve for distributing cleaning fluid to the units, and an intermittently acting mechanism for advancing said valve, and means actuating in timed relation with the functioning of each blower unit for actuating said mechanism.

21. In a boiler cleaner, a blower element, a prime mover therefor, a cleaning fluid supply, means for introducing cleaning fluid from said supply to said prime mover thereby causing the same to actuate the blower element, and means responding to the movement of the blower element for admitting cleaning fluid from said supply to the blower element.

22. The combination of operating mechanism for a soot blower, a fluid pressure actuated means forming a power device to operate said mechanism, thereby to control said blower, and automatic controlling means and instrumentalities automatically controlled thereby for supplying fluid pressure to periodically cause the operation of said power device, so that said blower is intermittent in operation and entirely automatic in the action thereof.

23. The combination specified in claim 22, said blower having a valve for the admission of steam, and means whereby said valve is automatically opened when said mechanism is operated.

24. The structure specified in claim 22, in combination with means to automatically supply steam to the blower by the operation of said power device.

25. In a boiler cleaner the combination with a soot blower unit, of a steam supply, a branch pipe leading from the steam supply to said unit, a valve controlling communication between said steam supply and said branch pipe, a steam operated plunger for actuating said valve, and means operated by said plunger to adjust said valve so as to connect the unit to said steam supply.

26. In a boiler cleaning system comprising a plurality of blower units, means for delivering a cleaning fluid to said units, fluid operated means for rotating each of said units individually, means for controlling the delivery of fluid to said units individually, automatic means for delivery of power to said rotating means, and means operable upon the rotation of each of said units for operating its respective fluid delivery control means.

In testimony whereof I affix my signature.

FRANK BOWERS.